US008369492B2

(12) United States Patent
Janke et al.

(10) Patent No.: US 8,369,492 B2
(45) Date of Patent: *Feb. 5, 2013

(54) DIRECTORY DIALER NAME RECOGNITION

(75) Inventors: Eric William Janke, Winchester (GB); Keith Sloan, Winchester (GB)

(73) Assignee: Nuance Communications, Inc., Burlington, MA (US)

( * ) Notice: Subject to any disclaimer, the term of this patent is extended or adjusted under 35 U.S.C. 154(b) by 908 days.

This patent is subject to a terminal disclaimer.

(21) Appl. No.: 12/168,444

(22) Filed: Jul. 7, 2008

(65) Prior Publication Data

US 2008/0267364 A1 Oct. 30, 2008

Related U.S. Application Data

(63) Continuation of application No. 10/997,589, filed on Nov. 24, 2004, now Pat. No. 7,412,386.

(30) Foreign Application Priority Data

Nov. 26, 2003 (GB) .................................. 0327416.4

(51) Int. Cl.
*H04M 1/64* (2006.01)
*H04Q 3/62* (2006.01)
*G10L 15/00* (2006.01)

(52) U.S. Cl. ................. 379/88.03; 370/352; 379/88.04; 379/88.16; 379/93.15; 379/399.01; 379/433.07; 455/564; 704/231; 704/240; 704/251; 704/254; 704/277; 710/1

(58) Field of Classification Search ............... 379/88.01, 379/88.03, 88.04, 88.16, 433.07, 93.15, 399.01; 704/244, 254, 277, 231, 240, 243, 251, 256.1, 704/270, 275; 370/352; 455/564; 710/1
See application file for complete search history.

(56) References Cited

U.S. PATENT DOCUMENTS

| RE32,012 | E   | * | 10/1985 | Pirz et al. ..................... 704/275 |
|----------|-----|---|---------|-------------------------------------------|
| 5,912,949 | A   | * | 6/1999  | Chan et al. ................. 379/88.03 |
| 5,917,891 | A   | * | 6/1999  | Will ............................ 379/88.03 |
| 5,960,393 | A   | * | 9/1999  | Cohrs et al. .................... 704/240 |
| 6,014,624 | A   | * | 1/2000  | Raman ........................... 704/243 |
| 6,018,568 | A   | * | 1/2000  | Furman et al. ............. 379/93.15 |
| 6,076,054 | A   | * | 6/2000  | Vysotsky et al. ............. 704/240 |
| 6,167,117 | A   | * | 12/2000 | Will ............................ 379/88.03 |
| 6,263,216 | B1  | * | 7/2001  | Seydoux et al. .............. 455/564 |
| 6,374,221 | B1  | * | 4/2002  | Haimi-Cohen ............ 704/256.1 |
| 6,690,772 | B1  | * | 2/2004  | Bechtel et al. ............. 379/88.03 |
| 6,741,677 | B2  | * | 5/2004  | Reformato et al. ........ 379/88.01 |
| 6,744,861 | B1  | * | 6/2004  | Pershan et al. ............. 379/88.03 |
| 6,757,388 | B2  | * | 6/2004  | Luo ........................... 379/433.07 |
| 6,915,262 | B2  | * | 7/2005  | Reding et al. ................. 704/275 |
| 6,963,633 | B1  | * | 11/2005 | Diede et al. ................ 379/88.03 |
| 7,006,972 | B2  | * | 2/2006  | Hwang ........................ 704/244 |

(Continued)

*Primary Examiner* — Gerald Gauthier
(74) *Attorney, Agent, or Firm* — Wolf, Greenfield & Sacks, P.C.

(57) ABSTRACT

A method, apparatus, computer program product and service for directory dialer name recognition. The directory dialer has a directory of names and a first name grammar and a second name grammar representing phonetic baseforms of first names and second names respectively. The method includes: receiving voice data for a spoken name after requesting a user to speak the required name; extracting a set of phonetic baseforms for the voice data; and finding the best matches between the extracted set of phonetic baseforms voice data and any combination of the first name grammar and the second name grammar. The method can further include: checking the best match against the directory of names; if the best match does not exist in the directory, informing the user and prompting the next best match as an alternative; and if the best match does exist in the directory, forwarding the call to that best match.

12 Claims, 3 Drawing Sheets

U.S. PATENT DOCUMENTS

| | | | |
|---|---|---|---|
| 7,260,187 B1 * | 8/2007 | McAllister | 379/88.04 |
| 7,260,530 B2 * | 8/2007 | Werner | 704/251 |
| 7,383,187 B2 * | 6/2008 | Damiba | 704/270 |
| 7,412,036 B1 * | 8/2008 | Charpentier et al. | 379/88.03 |
| 7,412,386 B2 * | 8/2008 | Janke et al. | 704/254 |
| 7,477,728 B2 * | 1/2009 | Park et al. | 379/88.03 |
| 7,512,114 B2 * | 3/2009 | Laturell | 370/352 |
| 8,135,589 B1 * | 3/2012 | Reding et al. | 704/231 |
| 2003/0007608 A1 * | 1/2003 | Buntschuh et al. | 379/88.01 |
| 2004/0240633 A1 * | 12/2004 | Sloan | 379/88.16 |
| 2005/0144014 A1 * | 6/2005 | Janke et al. | 704/277 |
| 2008/0267364 A1 * | 10/2008 | Janke et al. | 379/88.03 |

* cited by examiner

DIRECTORY DIALER NAME RECOGNITION

CROSS-REFERENCE TO RELATED APPLICATIONS

This application claims the benefit under 35 U.S.C. §120 as a continuation (CON) of U.S. Non-Provisional Application Serial No.: 10/997,589, filed Nov. 24, 2004, entitled "Directory Dialer Recognition," now issued U.S. Pat. No.: 7,412,386, which claims the benefit of British Patent Application No. 0327416.4, filed Nov. 26, 2003. Each of the foregoing applications is incorporated herein by reference in its entirety.

BACKGROUND

1. Technical Field

This invention relates to a method and apparatus for voice operated directory dialer name recognition. In particular, the invention relates to an improvement for enabling the directory dialer to recognize a spoken name which is not part of the system directory.

2. Description of the Related Art

IBM® Directory Dialer is a speech enabled application running on an interactive voice response system (IVR) with name recognition functionality (for instance IBM ViaVoice®). Name recognition differs from speech recognition primarily that the recognition is focused on only names rather than general vocabulary. Hence, the phoneme set and the grammar sets of allowable phonemes relate only to names. In principle, this should result in much simpler technology than would be needed for full speech recognition. The IVR connects to a telephony network and prompts a telephone user for the name of the person that they wish to call. The directory dialer recognizes the name, matches the name to the respective number, and transfers the call to the number for the user.

In order for the directory dialer to work it needs to extract information from a database of names and associated telephone numbers. A useful directory Internet protocol used by email clients to look up contact information is LDAP (Lightweight Directory Access Protocol). In a directory dialer an overnight provisioning process accesses the LDAP database to extract names and produce baseforms and grammars as needed by the name recognition process. A baseform is a basic phonetic element such as a phoneme; all possible baseforms form the acoustic model of the directory dialer. A grammar defines sequences of baseforms, each sequence associated with a name.

The operation of this directory dialer is shown in FIG. 2. In the Figures, a left pointing box is an action performed by the directory dialer and a right pointing box is an action performed by a user. The directory dialer waits, step 201, for a user to call the IVR system using a phone number indicative of a directory dialer application to be used. The application greets, step 203, the user with a welcoming message and prompts, step 205, for the name of person being called. Some variations require name and location or name and department. Once the user has spoken the name, step 207, the application attempts to recognize, at step 209, the spoken name.

The name recognition process of the prior art and the process of the present embodiment involve breaking the speech down into msec chunks (typically 10 msec). These chunks are then processed to produce a number of spectral fourier values, say 64 values. The number of values is further reduced by normalizing and fitting polynomial coefficients to the fourier values. By looking at adjacent chunks to provide delta coefficients, the number of coefficients is reduced to typically 39. The name recognition system then performs pattern recognition on a group of coefficients to identify a specific phoneme. Since the accuracy is far from perfect, a best fit of the most likely phonemes and then the most likely strings of phonemes is made. The number of possible strings is restricted to the phoneme sets in the grammars. The system then finds the most likely name in the directory as well as an overall confidence score as to how well the phonemes match.

The application compares the confidence score with an upper threshold value (x), step 211. If the confidence score is above the upper threshold value (x) then it is assumed that the user's speech has been correctly recognized and the call is immediately transferred, at step 213, to the recognized destination name. Otherwise the directory dialer compares the confidence score with a lower threshold value (y), step 215. If the confidence score is below the lower threshold value (y), step 215, then the process moves to step 217. Otherwise the process transfers to step 216 where the directory dialer apologizes for not understanding and starts over at step 205. At step 217 the user is asked to confirm with a 'yes' or 'no' the recognized name. The user speaks a reply, step 219, and the call is then either transferred, step 221, to the appropriate number or the system prompts the user to try again and the process repeats, step 205.

It is frustrating for users when name recognition does not recognize a spoken name and the directory dialer forwards the user to best recognized name without checking. If the best recognized name is incorrect then the user will not know until the call is put through to the wrong person. However in some cases it is not the directory dialer that has made an error but the user unwittingly speaks an invalid name, either as a mistake or as a result of somebody leaving the company and no longer being included in the directory. Mistakes occur simply when a user incorrectly remembers a persons first name or second name, e.g., somebody asks for Kevin Sloan, when they mean Keith Sloan or Kevin Smith.

Invalid names are not part of the grammar because the grammar is a finite number of sets of baseforms corresponding to the set of names in the directory.

Directory dialers that construct grammars from a text directory are known. In the prior art it is known to construct a grammar as a concatenation of phonemes from all the text of the names as found in the text directory. This will include first and family names and all other names. One problem is that it does not allow the speaker to understand if the spoken name exists in the directory since the directory dialer will always select the nearest match in the grammar. The directory dialer selects the nearest match regardless of whether the recognition is correct or whether the spoken name exists in the directory. A solution to this problem is to have a very large number of allowable names in the grammar. However this would demand excessive memory and processing.

Another solution is found in U.S. Pat. No. 5,912,949. This publication discloses a directory dialer that will always prompt the user with the result before connecting the user to the recognized name. This publication also recognizes a name and an initial from voice data and discloses that the system may ask the user directly for the name and initial of the desired name before any attempt to recognize the name is made. However, this publication describes how each name in the directory includes a phoneme string comprising the name and the initials. Moreover, more often than not, the name recognition is correct and it can also become frustrating to be asked each time to confirm a correctly recognized name.

SUMMARY OF THE INVENTION

According to a first aspect of the present invention there is provided a method in a directory dialer, the directory dialer having a directory of names, each name having a first part and a second part, and a first name grammar representing phonetic baseforms of first names and a second name grammar representing phonetic baseforms of second names. The method includes the steps of: receiving voice data for a spoken name after requesting a user to speak the required name; extracting a set of phonetic baseforms for the voice data; and, finding the best match between the extracted set of phonetic baseforms voice data and any combination of the phonetic baseforms in the first name grammar and the second name grammar. Advantageously the method can further include: checking the best match against the directory of names; if the best match does not exist in the directory, informing the user, finding the next best match between the extracted set of phonetic baseforms and any combination of the phonetic baseforms in the first and the second name grammar; and prompting the next best match as an alternative.

This solution allows the directory dialer to recognize if the spoken name is not in the user directory and to give the user further options as opposed to forwarding to the best complete match straight away. The solution improves upon the prior art directory dialer to accommodate the invalid names and reduce the risk of frustration that would otherwise occur when the user speaks an invalid name.

In a presently preferred embodiment the step of finding the best match includes: finding the best first name matches in a first grammar; finding the best second name matches in a second grammar; and creating a list of permutations of the best first name and second name matches. In this embodiment the first grammar represents the sets of phonemes for all the first names in the directory dialer and the second grammar represents the allowed sets of phonemes for all the second names (family names) in the directory.

Whereas the prior art forms a single grammar of complete names in the directory, the presently preferred embodiment forms two grammar sets: a first set of first names phoneme combinations and a second set of second names phoneme combinations. Any first name from the first set combined with any second name from the second set is a valid name which then needs to be checked to see if the combination is an actual name in the directory. The preferred embodiment ensures that every name that is a directory name can be recognized and that any combination of first names and second names in the directory can be recognized. This solution does not ensure that every spoken name will be recognized but it allows a good approximation to ensure that all common combinations of names will be recognized. The preferred embodiment uses existing method for both first and second names and then the results are combined for the list of best complete matches.

In an alternative embodiment the step of finding the best name matches comprises: sequentially finding best first matches and then second name matches using a concatenation of the first name grammar and the second name grammar.

The directory advantageously indicates which names have been through the provisioning process so that the first and second name grammar memories are updated with only new first names and new second names during the provisioning process. This allows more combinations of first and second names to be searched than if only the present LDAP names are used. Furthermore the first and second names grammars are pre-populated with first and second names prior to provisioning.

DESCRIPTION OF THE DRAWINGS

In order to promote a fuller understanding of this and other aspects of the present invention, an embodiment of the invention will now be described, by means of example only, with reference to the accompanying drawings in which.

DESCRIPTION OF THE EMBODIMENTS

Figure 1:
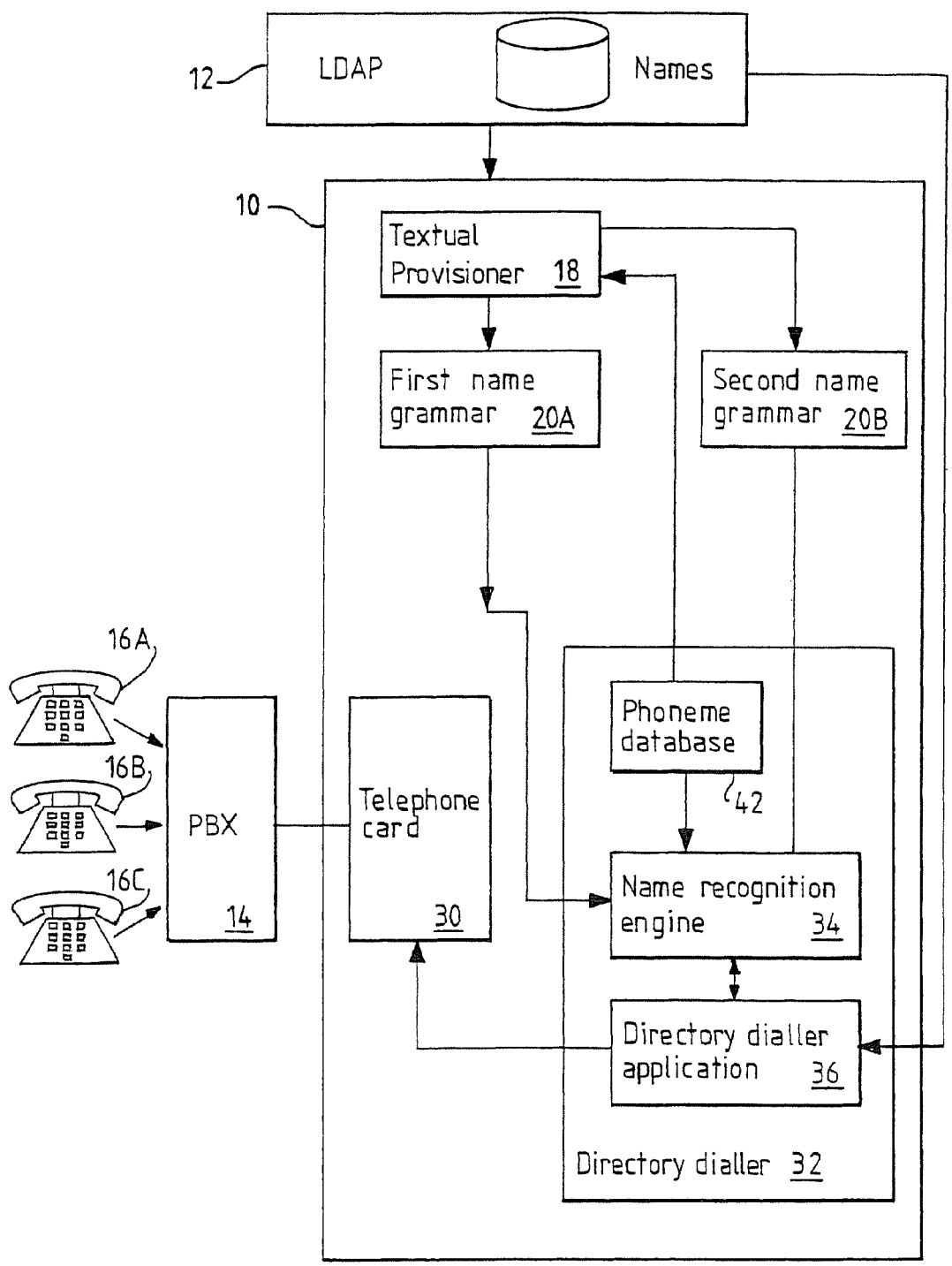
FIG. 1 is a schematic diagram of the main components of an embodiment of the invention.
Figure 2:
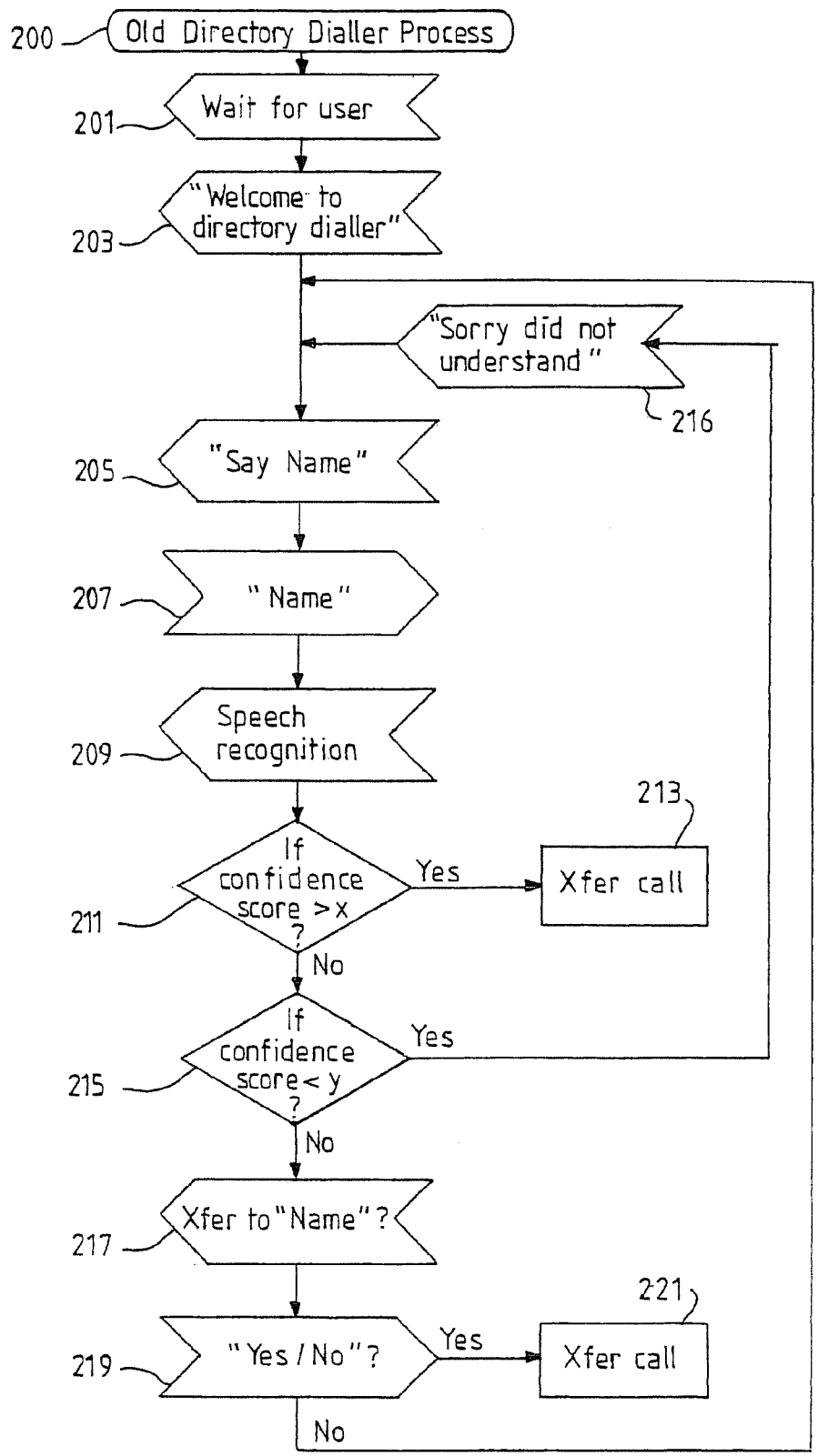
FIG. 2 is a schematic diagram of the method of the prior art.

Referring to FIG. 1 there is shown a schematic diagram of the main components of a voice dialer system in accordance with the inventive arrangements. The system comprises an interactive voice response system (IVR) 10 connected to an LDAP (Lightweight Directory Access Protocol) directory of names 12 and a telephony switch 14. The telephony switch 14 is connected to a telephony network represented by telephones 16A, 16B and 16C.

IVR 10 may be based on an IBM WebSphere® Voice Response v5.1 (WVR) software and IVR telephony card hardware executing on a IBM AIX® pSeries® platform. This combination gives a scalable system capable of handling anything from a few hundred voice channels for a single IVR telephony card to a few thousand voice channels for five or more IVR telephony cards. Although WVR is the preferred IVR software any IVR software that is capable of handling name recognition and a voice enabled directory dialer would be suitable. The LDAP directory is just one example of a directory protocol that may be used in the embodiment. LDAP is particularly suitable when the directory is located on the Internet. The telephony network in the embodiment is the plain old telephone system (POTS) but in other embodiments a voice over IP (VoIP) telephony network or a video telephony system may equally be used.

IVR 10 can comprise: a textual provisioner 18; first name grammar 20A and second name grammar 20B; a telephony card 30 and a directory dialer 32. The directory dialer 32 can comprise: a name recognition engine 34 controlled by a directory dialer application 36; and a phoneme database 42.

Textual provisioner 18 performs the conversion of the text names in the LDAP directory 12 into their phonetic equivalents using a statistical algorithm and the phoneme database 42. Provisioning can be an overnight process and the phonetic equivalents of the first and second names are saved to the respective first name and second name grammar 20A and 20B. First name and second name grammar 20A and 20B are connected with the name recognition engine 34. Since names in the LDAP directory will be removed and added over time, it is not necessary to perform provisioning over the entire LDAP but only the new names in the LDAP and the LDAP itself indicates which names have been through the provisioning process. The first and second name grammars are updated with only new first names and new second names during the provisioning process. This allows more combinations of first and second names to be searched than if only the present LDAP names are used. Furthermore the first and second names grammar memories are pre-populated with first and second names prior to provisioning. Textual provisioner 18 also uses the phoneme database 42 during construction of the grammars.

Telephony card 30 is a POTS interface between PBX 14 and the directory dialer 32 allows incoming telephone calls to directory dialer 32. In a voice-over-IP (VOIP) embodiment the telephony card is VoIP compatible.

In this embodiment name recognition engine 34 is based on IBM ViaVoice although other name recognition engines could be used.

Figure 3:
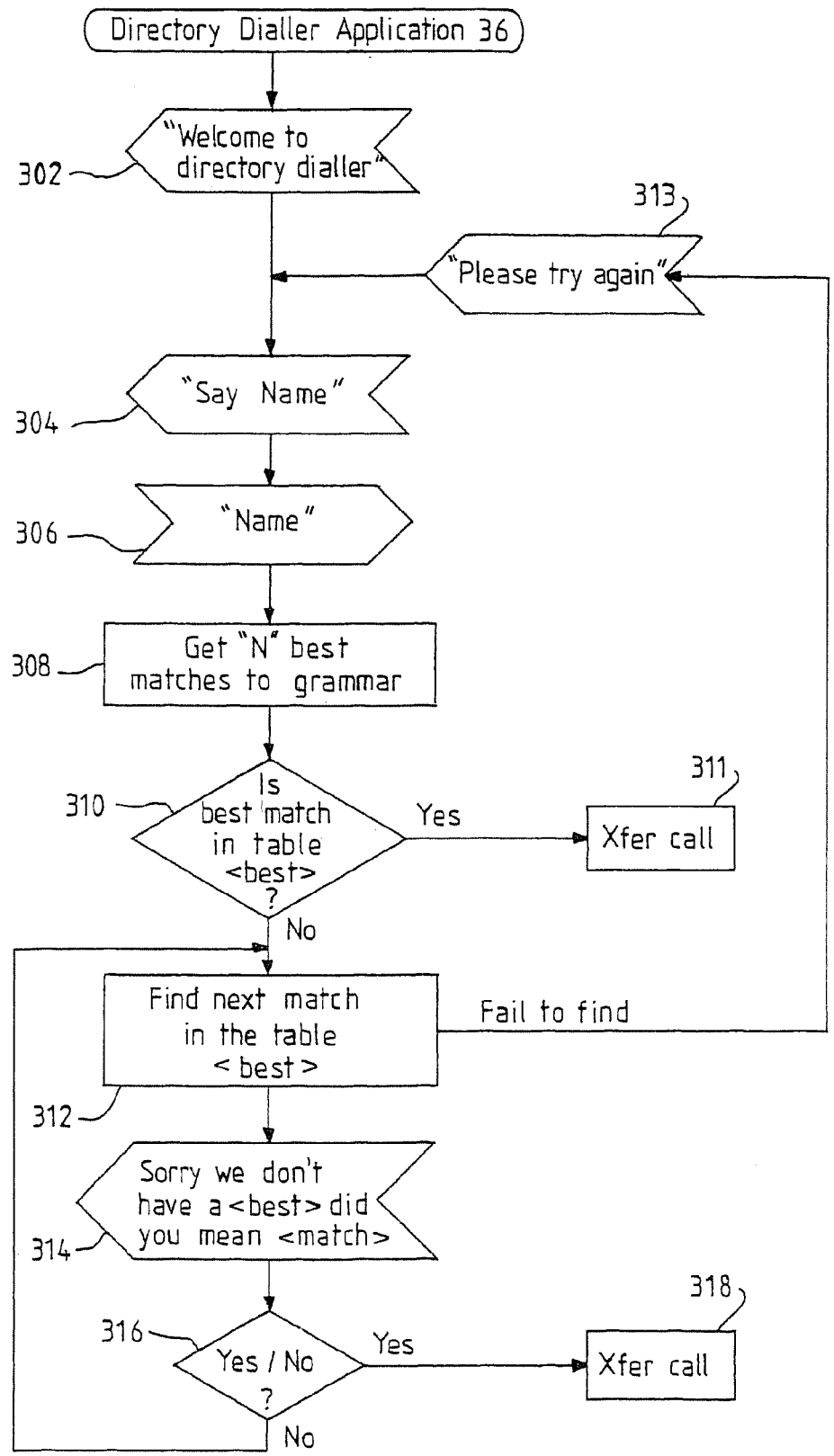
FIG. 3 is a schematic diagram of the method of an embodiment of the invention.

The directory dialer application 36 controls the directory dialer 32 and is shown and described in more detail in FIG. 3. The directory dialer application 36 searches the directory 12 and controls the telephone card 30 and the name recognition engine 34.

Phoneme database 42 provides the basic phonetic units used by the textual provisioner 18 to create grammars. It is also used by the name recognition engine 34 to break down incoming speech data into its phonetic baseform.

Prior to the operation of the directory dialer application 36 the textual provisioner 18 builds the first name grammars 20A and second name grammars 20B.

The method of the present embodiment (directory dialer application 36) will now be described with respect to FIG. 3. Directory dialer application 36 comprises a series of sequential instruction steps cumulating in a transfer of a call from a user to a number corresponding with an identified name.

At step 302, the directory dialer application 36 can play out a greeting prompt which can be any suitable greeting such as "Welcome to the directory dialer". The prompt instruction is sent through the telephone card 30 to the user telephone 16A through PBX 14.

At step 304, the directory dialer application 36 can play another prompt to request the user speak the name required. The prompt may be of the expert type such as "Say name" or a more detailed request to speak a name clearly and slowly. This step can also provides a return point when the name must be spoken again.

At step 306, the user speaks the desired name and the directory dialer application 36 receives voice data representing the name as input from the user telephone 16A via PBX 14 and telephone card 30.

At step 308, the directory dialer application 36 requests the name recognition engine 34 to perform analysis on the voice data. The name recognition engine extracts phonetic baseforms from the voice data and matches the extracted baseforms against any combination of the first and second name grammars 20A and 20B. The 'N' best complete name matches are returned to the directory dialer application.

At step 310, the directory dialer application 36 checks if the best match is included in the directory 12. If so then the application transfers the call to the number associated with that name at step 311. If the best match is not included in the directory then the process continues at step 312.

At step 312, the application searches the 'N' best matches against the directory to find the best match between the recognized names and the directory. If no match is found then the name recognition has failed and the process must start again via step 313. If a match is found then the process continues at step 314.

At step 313, the application can play out the prompt "Please try again" and can return to step 304.

At step 314, the application plays out the prompt "Sorry we do not have <best match> did you mean <next best match>". Where the <best match> represents the best match to the spoken name but which is not found in the directory and the <next best match> represents the next best match with the spoken name that is in the directory.

At step 316 the application receives 'yes' or 'no' input from the user. If 'yes' then the call is transferred to the <next best match> at step 318. If 'no' then the process returns to step 312 to find the next <next best match> in the list of 'N' best matches.

In another embodiment the <next best match> represents an option list of best matches and the user can choose which option they require.

While it is understood that the voice dialer application may be deployed by manually loading directly into the IVR 10 via loading a storage medium such as a CD, DVD, etc., the process software may also be automatically or semi-automatically deployed into a computer system by sending the process software to a central server or a group of central servers. The process software is then downloaded into the client computers that will execute the process software.

IBM, AIX, pSeries, ViaVoice and WebSphere are trademarks of International Business Machines Corporation in the United States, other countries, or both.

This invention may be embodied in other forms without departing from the spirit or essential attributes thereof. Accordingly, reference should be made to the following claims, rather than to the foregoing specification, as indicating the scope of the invention.

The invention claimed is:

1. An interactive voice response system comprising:
a database storing a directory of names, each name specifying a first name and a second name; and
a server, capable of accessing the database, the server configured to perform:
receiving voice data for a spoken name from a user;
extracting a set of phonetic baseforms from the voice data;
finding a best match to the extracted set of phonetic baseforms from combinations of phonetic baseforms from a first name grammar representing phonetic baseforms for first names in the directory of names and a second name grammar representing phonetic baseforms for second names in the directory of names;
determining whether a combination of first name and second name found to be the best match exists in the directory of names; and
forwarding the call if the combination is determined to exist in the directory of names.

2. The interactive voice response system according to claim 1, the the server further configured to perform:
if the combination of first name and last name found to be the best match is determined not to exist in the directory of names, informing the user and prompting the user with an alternative combination of first name and second name found to be a next best match.

3. The interactive voice response system according to claim 1, wherein finding the best match comprises:
finding a first set of best first name matches to the extracted set of phonetic baseforms from a set of phonetic baseforms in the first name grammar;
finding a second set of best second name matches to the extracted set of phonetic baseforms from a set of phonetic baseforms in the second name grammar;
creating a list of combinations of phonetic baseforms in the first set and the second set; and
selecting the combination with a highest confidence score as the best match.

4. The interactive voice response system according to claim 1, wherein the first name grammar is derived from phonemes for first names in the directory and the second name grammar is derived from phonemes for second names in the directory.

5. The interactive voice response system according to claim 1, wherein the directory indicates which names are included in the first and second name grammars so that the first and second name grammars are updated only with new first names and new second names in the directory.

6. The interactive voice response system according to claim 1, wherein first and second name grammar memories comprise first and second names not included in the directory.

7. A computer-readable storage medium storing computer program instructions that, when executed by a computer, cause the computer to perform:
  receiving voice data for a spoken name from a user;
  extracting a set of phonetic baseforms from the voice data;
  finding a best match to the extracted set of phonetic baseforms from combinations of phonetic baseforms from a first name grammar representing phonetic baseforms for first names in a directory of names and a second name grammar representing phonetic baseforms for second names in the directory of names;
  determining whether a combination of first name and second name found to be the best match exists in the directory of names; and
  forwarding the call if the combination is determined to exist in the directory of names.

8. The computer readable storage medium according to claim 7, wherein the computer program instructions further cause the computer to perform:
  if the combination of first name and last name found to be the best match is determined not to exist in the directory of names, informing the user and prompting the user with an alternative combination of first name and second name found to be a next best match.

9. The computer readable storage medium according to claim 7, wherein finding the best match comprises:
  finding a first set of best first name matches to the extracted set of phonetic baseforms from a set of phonetic baseforms in the first name grammar;
  finding a second set of best second name matches to the extracted set of phonetic baseforms from a set of phonetic baseforms in the second name grammar;
  creating a list of combinations of phonetic baseforms in the first set and the second set; and
  selecting the combination with a highest confidence score as the best match.

10. The computer readable storage medium according to claim 7, wherein the first name grammar is derived from phonemes for first names in the directory and the second name grammar is derived from phonemes for second names in the directory.

11. The computer readable storage medium according to claim 7, wherein the directory indicates which names are included in the first and second name grammars so that the first and second name grammars are updated only with new first names and new second names in the directory.

12. The computer readable storage medium according to claim 7, wherein first and second name grammar memories comprise first and second names not included in the directory.

* * * * *